Patented Feb. 4, 1947

2,415,319

UNITED STATES PATENT OFFICE 2,415,319

VINYL RESIN MOLDING COMPOSITION

George W. Whitehead, Springfield, Mass., assignor to Monsanto Chemical Company, St. Louis, Mo., a corporation of Delaware No Drawing. Application April 8, 1943,
Serial No. 482,316

20 Claims. (Cl. 260—73)

The present invention relates to polyvinyl acetaldehyde acetal resin molding compositions.

Polyvinyl acetaldehyde acetal resins have heretofore found but little use in molding compositions due to several reasons, one of which is the notorious sticking of the molding powder to the mold. Another objection heretofore to the use of polyvinyl acetaldehyde acetal resins in molding compositions has been the forming of laminations or layers thereof during injection molding processes.

An object of this invention is to provide a new molding composition.

Another object of this invention is to provide a new molding composition comprising a polyvinyl acetaldehyde acetal resin which not only takes the form of the mold readily on the application of heat, but which may be readily removed from the mold, and which does not result in the forming of layers or laminations in an injection molded product.

Other and further objects of the present invention are to provide molded products having high water resistance, toughness, low shrinkage and marked resistance to heat.

More particularly, the present invention relates to molding compositions comprising partial polyvinyl acetaldehyde acetal resins, which tend to stick to the mold, to which have been added one or more mono-hydroxy carboxylic acids containing at least two carbon atoms.

Polyvinyl acetaldehyde acetal resins may be prepared, for example, by hydrolyzing a polyvinyl ester, for example, polyvinyl acetate, and then reacting the resulting hydrolysis product with acetaldehyde. U. S. patent to Morrison et al., Reissue 20,430, dated June 29, 1937, illustrates suitable general methods for preparing such resins. Polyvinyl acetal resins prepared in this manner may have a certain number of the ester radicals originally present in the polyvinyl ester which have not been removed, as well as a certain number of hydroxyl radicals (which have replaced ester radicals) which have not been replaced with acetal radicals.

In accordance with the present invention, it has been found that as a result of incorporating mono-hydroxy-carboxylic acids, containing at least two carbon atoms, in polyvinyl acetaldehyde acetal resin molding compositions that tend to stick to the molds employed in shaping such compositions under pressure, molded products are obtained which are readily removed from the molds and which have other advantages set forth hereinafter.

The polyvinyl acetaldehyde acetal resins contemplated according to the present invention are those that are water insoluble at room temperature. Molding compositions containing such resins tend to stick to the molds after molding, particularly to metal molds, for example, stainless steel or tool steel molds. More particularly, polyvinyl acetaldehyde acetal resins in which the sum of the ester radicals and twice the number of the acetal radicals exceeds the number of hydroxyl radicals, are water insoluble and are contemplated by the present invention, particularly when the polyvinyl acetaldehyde acetal resin contains at least 20% acetal on a chemically equivalent basis (each acetal radical being chemically equivalent to two hydroxy or two ester radicals).

According to one embodiment of this invention the polyvinyl acetaldehyde acetal resins employed may be considered to be made up on a weight basis, of 4 to 20% hydroxyl radicals calculated as polyvinyl alcohol, 8% to 45% acetate radicals calculated as polyvinyl acetate (when the acetal resin is prepared from polyvinyl acetate) and the balance substantially acetaldehyde acetal.

According to another embodiment of this invention, the polyvinyl acetaldehyde acetal resins employed may be considered to be made up, on a weight basis, of substantially 4 to 15% hydroxyl radicals calculated as polyvinyl alcohol, 16 to 30% acetate radicals calculated as polyvinyl acetate (when the acetal resin is prepared from polyvinyl acetate) and the balance substantially acetaldehyde acetal.

As further examples of polyvinyl acetaldehyde acetal resins for use according to this invention may be mentioned water insoluble polyvinyl acetaldehyde acetal resins in which a portion, for example, from 25% to 75%, of the acetal radicals are made with one or more aldehydes other than acetaldehyde. Such other aldehydes may include formaldehyde, propionaldehyde, butyraldehyde, benzaldehyde, crotonaldehyde and the like. Particularly preferred are the lower aliphatic saturated aldehydes such as formaldehyde, propionaldehyde and butyraldehyde. Thus, one embodiment of a polyvinyl acetaldehyde acetal resin containing acetal radicals other than acetaldehyde acetal radicals is one containing, on a weight basis, 13% hydroxyl radicals calculated as polyvinyl alcohol, 2 to 6% acetate radicals calculated as polyvinyl acetate and the balance substantially acetaldehyde and butyraldehyde acetal in a molar ratio of 65 to 50% acetaldehyde acetal and 35 to 50% butyraldehyde acetal.

While the quantities of the acids employed according to this invention may be varied widely, it is generally preferred to employ relatively small amounts thereof. Furthermore, while I am not limited by any theories as to the mechanism of the invention, it is believed that chemical combination takes place between at least a portion of the acid and the polyvinyl acetaldehyde acetal resin during the mixing or molding steps.

As set forth above, the mono-hydroxy carboxylic acids employed according to this invention contain at least two carbon atoms, for example, glycollic, lactic, malic, citric, salicylic, mandelic, hydroxy butyric, hydroxy valeric and hydroxy stearic acids. These acids may be aliphatic, aromatic, alkyl-substituted aromatic or aryl-substituted aliphatic, mono-hydroxy carboxylic acids. In general, it is preferred to employ mono-hydroxy carboxylic acids containing at least two and less than eight carbon atoms. More particularly, aliphatic mono-hydroxy carboxylic acids are preferred, especially those containing at least two and less than seven carbon atoms, particularly those in which the hydroxyl group is attached to the same carbon atom, or a carbon atom adjacent to the carbon atom to which a carboxyl group is attached.

It is known to employ stearic acid in polyvinyl acetal molding compositions, but such use is generally unsatisfactory due to discoloration of the molded product and other undesirable features.

The following are given by way of specific examples and are not to be understood as limitative of the scope of the invention.

To portions comprising 100 parts by weight of a polyvinyl acetaldehyde acetal resin made from polyvinyl acetate which may be considered to be made up, on a weight basis, of 7% hydroxyl radicals calculated as polyvinyl alcohol, 17% acetate radicals calculated as polyvinyl acetate and the balance substantially acetaldehyde acetal, are separately added 1, 2 and 8 parts by weight, respectively, of malic acid and the resulting mass thoroughly mixed in a suitable manner and molded under heat and pressure in suitable compression and injection molding apparatus, the molds being made of tool steel. The compositions all exhibit good compression and injection molding properties and are readily removed from the mold, after cooling. Moreover, the molded products have a good surface finish and the injection molded articles do not exhibit laminations.

Molded products prepared in the same manner in the absence of a mono-hydroxy carboxylic acid stick to the molds and have a roughened surface finish. Injection molded articles exhibit undesirable formation of layers or laminations.

To portions comprising 100 parts by weight of the polyvinyl acetaldehyde acetal resin given above are separately added 1, 2, 4, 8 and 12 parts by weight respectively of citric acid and the resulting masses mixed thoroughly on the milling rolls in the well known manner and molded in suitable compression and injection molding apparatus. The compositions all exhibit good compression and injection molding properties and are readily removed from the mold.

To portions comprising 100 parts by weight of the polyvinyl acetaldehyde acetal resin given above there are separately added 1, 2, 4, 6, and 30 parts respectively, by weight of lactic acid, and the resulting masses are mixed thoroughly on the mixing rolls in the well known manner and molded in suitable compression and injection molding apparatus. The compositions all exhibit the properties typical of the class in that they exhibit good molding properties and the molded articles are readily removed from the molds.

The polyvinyl acetaldehyde acetal resin given above may be employed in conjunction with the acids of this invention together with suitable fillers and plasticizers and the resulting mixtures are found to exhibit the desirable molding properties typical of the present invention.

Thus, to 100 parts by weight of the polyvinyl acetaldehyde acetal resin given above there are added 6 parts by weight of the lactic acid and 25 parts by weight of dibutyl phthalate. The resulting mixture is found to possess good compression and injection molding properties and the molded product is readily removed from the mold.

As further specific examples of the present invention, to separate portions of 100 parts by weight of a polyvinyl acetaldehyde acetal resin made from polyvinyl acetate which may be considered to be made up, on a weight basis, of 12% hydroxyl radicals calculated as polyvinyl alcohol, 30% acetate radicals calculated as polyvinyl acetate and the balance substantially acetaldehyde acetal, there are added 2 parts by weight of lactic acid and varying proportions by weight of dibutyl phthalate. Thus, separate mixes are formed containing 5, 10 and 15 parts by weight, respectively, of dibutyl phthalate. The mixes so formed are found to exhibit excellent molding properties and the molded products are free from any tendency to stick to the mold.

In all cases in the examples given above the molded products have a good finished surface and the injection molded articles do not exhibit the undesirable formation of layers or laminations.

As another modification of this invention, to 100 parts by weight of the polyvinyl acetaldehyde acetal resin as defined in the first example, there is added 20 parts by weight of a dicarboxylic acid anhydride, for example, phthalic anhydride, 10 parts by weight of dibutyl phthalate and 5 parts by weight of lactic acid and the resulting mass mixed in a suitable manner and molded. The product exhibits good molding properties, is readily removed from the mold, and is an improvement in this respect over the same composition in the absence of an acid of this invention. This molded product is somewhat harder than similar molded compositions made in the absence of anhydride, due, it is believed, to a reaction taking place between the acetal resin and the anhydride.

In place of phthalic anhydride, other dicarboxylic acid anhydrides may be employed, for example, succinic anhydride, and maleic anhydride, although aromatic dicarboxylic acid anhydrides containing a single benzene nucleus are preferred.

By operating according to the present invention, molded products having increased water resistance, toughness, low shrinkage, and resistance to heat are readily obtainable. Furthermore, as hereinbefore set forth, acetal molding compositions containing the acids of this invention may contain additionally fillers and, if desired, suitable plasticizers.

Included within the scope of this invention are polyvinyl acetaldehyde acetal resins made from polymerized vinyl esters of other acids than acetic acid, for example, formic acid, propionic acid, butyric acid and the like, saturated lower aliphatic acids being preferred.

When the polyvinyl acetaldehyde acetal resins made from polyvinyl acetate set forth in embodiments of this invention given above are prepared from other polyvinyl esters, the same molar percentages of hydroxyl and ester groups are employed.

This application is a continuation-in-part of my co-pending application Ser. No. 305,894, filed November 24, 1939, now Patent No. 2,323,363.

What is claimed is:

1. A polyvinyl acetal resin pressure molding composition, having a decreased tendency to stick to a mold after molding, containing a physical mixture of a water insoluble polyvinyl acetaldehyde acetal resin, and normally having a tendency to stick to a mold, and 1 to 30 parts for every 100 parts of polyvinyl acetal resin of a mono-hydroxy carboxylic acid having at least two carbon atoms effective to reduce the tendency to stick to a mold, said polyvinyl acetaldehyde acetal resin containing at least 20% acetal on a chemical equivalent basis.

2. A molding composition as defined in claim 1 in which the sum of the ester radicals and twice the number of the acetal radicals in the polyvinyl acetaldehyde acetal resin exceeds the number of hydroxyl radicals.

3. A molding composition as defined in claim 1 in which a part of the acetal radicals in the polyvinyl acetaldehyde acetal resin are made from an aldehyde other than acetaldehyde.

4. A polyvinyl acetal resin pressure molding composition, having a decreased tendency to stick to a mold after molding, containing a physical mixture of a polyvinyl acetaldehyde acetal resin having an ester, hydroxyl and acetal radical content on a molar basis of a polyvinyl acetaldehyde acetal resin containing 8 to 45% polyvinyl acetate by weight, 4 to 20% polyvinyl alcohol by weight, and the balance substantially acetaldehyde acetal, and normally having a tendency to stick to a mold, and 1 to 30 parts for every 100 parts of polyvinyl acetal resin of a mono-hydroxy carboxylic acid having at least two carbon atoms effective to reduce the tendency to stick to a mold.

5. A polyvinyl acetal resin pressure molding composition, having a decreased tendency to stick to a mold after molding, containing a physical mixture of a polyvinyl acetaldehyde acetal resin having an ester, hydroxyl and acetal radical content on a molar basis of a polyvinyl acetaldehyde acetal resin containing from 16 to 30% polyvinyl acetate by weight and 4 to 15% polyvinyl alcohol by weight, and the balance substantially acetaldehyde acetal, and normally having a tendency to stick to a mold, and 1 to 30 parts for every 100 parts of polyvinyl acetal resin of a mono-hydroxy carboxylic acid having at least two carbon atoms effective to reduce the tendency to stick to a mold.

6. A molding composition as defined in claim 4 in which the mono-hydroxy carboxylic acid is an aliphatic mono-hydroxy carboxylic acid.

7. A polyvinyl acetal resin pressure molding composition, having a decreased tendency to stick to a mold after molding, containing a physical mixture of a polyvinyl acetaldehyde acetal resin having 8 to 45% acetate radicals by weight calculated as polyvinyl acetate, 4 to 20% hydroxyl radicals by weight calculated as polyvinyl alcohol and the balance substantially acetaldehyde acetal, and normally having a tendency to stick to a mold, and 1 to 30 parts for every 100 parts of polyvinyl acetal resin of a mono-hydroxy carboxylic acid having at least two but less than 8 carbon atoms effective to reduce the tendency to stick to a mold.

8. A molding composition as defined in claim 7 in which said acid is an aliphatic mono-hydroxy carboxylic acid.

9. A molding composition as defined in claim 7 in which said acid is an aliphatic mono-hydroxy carboxylic acid having at least 2 but less than 7 carbon atoms.

10. A molding composition as defined in claim 4 to which has been added a sufficient proportion of a dicarboxylic acid anhydride to increase the hardness of the molded composition.

11. A molding composition as defined in claim 4 to which has been added a sufficient proportion of an aromatic dicarboxylic acid anhydride having a single benzene nucleus to increase the hardness of the molded composition.

12. A molding composition as defined in claim 7 to which has been added a sufficient proportion of a dicarboxylic acid anhydride to increase the hardness of the molded composition.

13. A molding composition as defined in claim 7 to which has been added a sufficient proportion of phthalic anhydride to increase the hardness of the molded composition.

14. A molding composition as defined in claim 4 in which said acid is lactic acid.

15. A molding composition as defined in claim 4 in which said acid is malic acid.

16. A molding composition as defined in claim 4 in which said acid is citric acid.

17. A polyvinyl acetal resin pressure molding composition having a decreased tendency to stick to a mold after molding, containing a physical mixture of a water-insoluble polyvinyl acetaldehyde acetal resin and normally having a tendency to stick to a mold, and 1 to 30 parts for every 100 parts of polyvinyl acetal resin of a monohydroxy carboxylic acid having at least two carbon atoms and the sole carbonyl-containing groups being carboxyl groups, effective to reduce the tendency to stick to a mold, said polyvinyl acetaldehyde acetal resin containing at least 20% acetal on a chemical equivalent basis and the sum of the ester radicals and twice the number of the acetal radicals in said acetal resin exceeding the number of hydroxyl radicals.

18. A molding composition as defined in claim 4 in which the mono-hydroxy carboxylic acid has less than 8 carbon atoms.

19. A molding composition as defined in claim 4 in which the acid is an aliphatic mono-hydroxy carboxylic acid having less than 7 carbon atoms.

20. A molding composition as defined in claim 7 in which the acid is lactic acid.

GEORGE W. WHITEHEAD.

REFERENCES CITED

The following references are of record in the file of this patent:

UNITED STATES PATENTS

| Number | Name | Date |
| --- | --- | --- |
| 2,187,570 | Kranzlein | Jan. 16, 1940 |
| 2,194,994 | Belloc | Mar. 26, 1940 |
| 2,290,180 | Hershberger | July 21, 1942 |

FOREIGN PATENTS

| Number | Country | Date |
| --- | --- | --- |
| 416,412 | British | Sept. 10, 1934 |
| 356,408 | British | Sept. 10, 1931 |

OTHER REFERENCES

Lewkowitsch Chemical Technology and Analysis of Oils, Fats and Waxes vol. II, page 406 MacMillan Co., Longon (1922) Copy in Div. 50.

Chem. and Met. Eng. page 830 Dec. 1940. Copy in Pat. Off. Scientific Library, Lewkowitsch Chem. Tec. and Analysis of oils, Fats and Waxes vol. II, page 407. Copy in Div. 50.